May 6, 1969          H. G. HAHM          3,442,356

LOW-NOISE HYDRAULIC DISK BRAKE

Filed Dec. 5, 1967          Sheet 1 of 2

Heinz G. Hahm
INVENTOR.

BY

Karl F. Ross
Attorney

United States Patent Office 3,442,356
Patented May 6, 1969

3,442,356
LOW-NOISE HYDRAULIC DISK BRAKE
Heinz Günther Hahm, Frankfurt am Main, Germany, assignor to Alfred Teves, G.m.b.H., Frankfurt am Main, Germany, a corporation of Germany
Filed Dec. 5, 1967, Ser. No. 688,185
Claims priority, application Germany, Dec. 6, 1966, T 32,689
Int. Cl. F16d 55/00, 63/00
U.S. Cl. 188—73    9 Claims

ABSTRACT OF THE DISCLOSURE

A low-noise hydraulic spot-type disk brake wherein a piston whose axis coincides with the centrum of the brakingsurface lining is fitted with a sleeve of low-friction, wear and corrosion-resistant material in which the piston is eccentrically mounted to dispose the contact surface of the piston against the backing plate of the brakeshoe eccentrically with respect to the centrum of the braking surface of its lining and the axis of its cylinder bore.

---

My present invention relates to disk brakes and, more particularly, to hydraulically actuated segmental or spot-type disk brakes for automotive vehicles.

It has been recognized in recent years that, for many automotive-vehicle applications, a disk-type brake system offers considerable advantages over internal-expanding brakes. Thus, for example, a disk brake is more readily responsive to the actuation of the master cylinder, provides a firmer engagement of the rotating surface, and requires a smaller stroke of the master-cylinder piston than most internal-expanding brakes. The disk brake generally comprises a rotating brake disk coupled with the vehicle wheel or axle and having a pair of annular brake faces lying in planes transverse to the axis of rotation of the disk. Flanking the disk and juxtaposed with these annular braking faces over only a fraction of this surface, are a pair of brakeshoes which thus are of segmental configuration and engage only limited regions of the braking faces. Such brakeshoes are mounted in a yoke which is connected to a stationary portion of the vehicle, e.g. the axle housing or chassis, and are urged by respective wheel-brake pistons against the disk. To this end, wheel-brake cylinders are formed in the yoke and are connected by hydraulic lines with the master cylinder. In other variants, only a single wheel-brake cylinder is provided and either the disk or the yoke is axially shiftable to bring the opposite face of the disk into engagement with a brakeshoe fixed on the yoke when the piston urges its brakeshoe against the disk.

In earlier commonly assigned copending applications, e.g. applications Ser. No. 601,013 and Ser. No. 672,757, filed Dec. 12, 1966 and Oct. 4, 1967 by Ernst Meier and Hermann Seip and by Hans Joachim Anders, respectively, it has been pointed out that the squealing noises and raucous sounds characteristic of the application of the disk brake are related to the fact that the piston bears upon the backing plate of the brakeshoe in line with the center of gravity (centrum) of the contact surface of the brakeshoe with the disk. Thus it is there noted that a substantial reduction in the noise produced can be ensured by locating the contact zone of the piston and the backing plate of the brakeshoe somewhat offcenter with respect to the centrum of the contact surface of the brakeshoe with the disk and, advantageously, ahead of this centrum in the direction of rotation of the disk, especially on the flange side of the yoke. The term "flange side" is used herein to designate that lobe of the brake yoke which is affixed to the axle housing, the other lobe (or "wheel side") being cantilevered from the flange provided on the yoke to attach the same to the vehicle body. To accomplish such offsetting, the prior methods described in these copending applications, the principles of which are extended by the present invention, have included the cutting away of the contact face of the piston so that it is stepped or the insertion of a thin intermediate plate which is engaged by the piston at a location offset from the centrum and which bears over its fully surface with the backing plate of the brakeshoe so that it can be disposed between the piston and the brakeshoe. In still other teachings elucidated in these earlier applications, it is pointed out that similar results can be obtained by offsetting the cylinders in the lobes of the yoke with respect to one another. Such solutions have not been found to be desirable to a large measure because of the manufacturing problems involved in casting the yoke portions with eccentric cylinders, boring and finishing eccentric cylinders, etc. In fact, since the eccentricity of the wheel-brake cylinders of the brake yoke is determined by the dimensions of the brakeshoe and other considerations, it is difficult to standardize the eccentricity and mass-produce brake yokes for a variety of applications. The term "eccentricity" as used above is intended to indicate an offset of the center of the piston and its contact face with the backing plate of the brakeshoe from the centrum of the contact surface of the brake lining with the disk.

It is, therefore, the principal object of the present invention to provide an improved disk-brake assembly in which brake noise is reduced and the disadvantages of earlier systems are avoided.

This object and others which will become apparent hereinafter, are attained, in accordance with the present invention, by providing, in a disk brake of the general character described, a wheel-brake cylinder whose axis is aligned with the centrum of the surface of contact of the brakeshoe lining with the disk, and means in the cylinder for slidably positioning the piston eccentrically with respect to this centrum this means preferably being constituted of a cylindrical bushing with an eccentric bore slidably receiving the piston. This arrangement has the advtange that conventional yoke casing molds, the usual mold parts and the like, may be used without reboring the cylinder and without the complexities characterizing eccentric cylinder bores in the yoke. The assembly is modified to permit eccentic contact of the brake piston with the shoe without retooling. The assembly is facilitated since the bushing need only be inserted in the cylinder bore.

According to a further feature of this invention, the bushing is composed of a wear-resistant, low-friction and corrosion-resistant material such as stainless steel with a polished internal surface, a synthetic resin such as polytetrafluoroethylene, or the like. I found it also advantageous to provide means for angularly adjusting the position of the adapter bushing within the cylinder bore thereby varying the location of the axis of the piston and the contact surface both radially and peripherally from the axis of the cylinder bore and the centrum. To this end, the periphery of the bushing can be formed with angularly spaced notches engageable by a pin for the selective angular positioning of the bushing. Alternatively, the contact surface of the piston with the brakeshoe can be eccentrically positioned in the axially shiftable bushing which here forms part of the piston.

The above and other objects, features and advantages of the present invention will become readily apparent from the following description, reference being made to the accompanying drawing in which:

FIG. 1 is an elevational view of the flange side of a disk-brake yoke, the overall construction of which can correspond to any of those of the aforementioned copending applications and the applications mentioned herein, which has a wheel-brake cylinder whose axis is aligned with the centrum of the surface of contact of the brakeshoe and has an adapter according to the provisions of the present invention;

Figure 1:
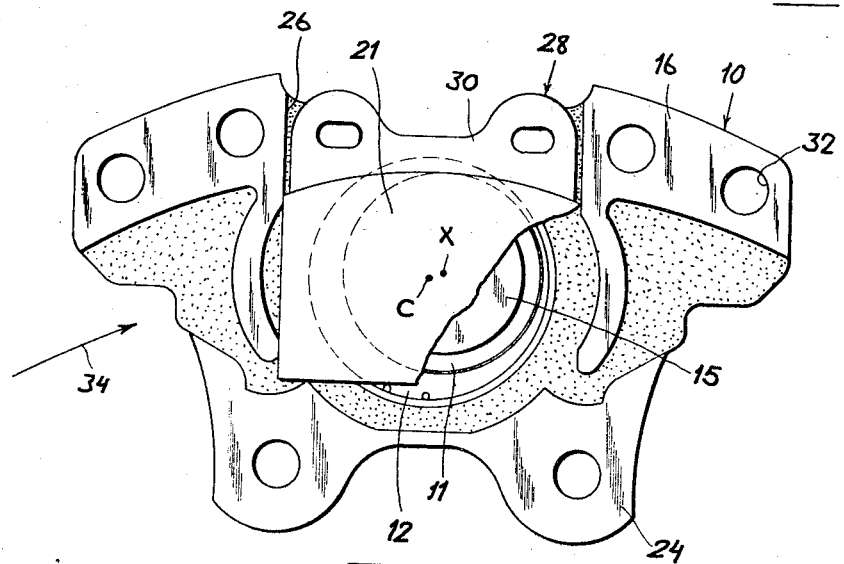
Figure 2:
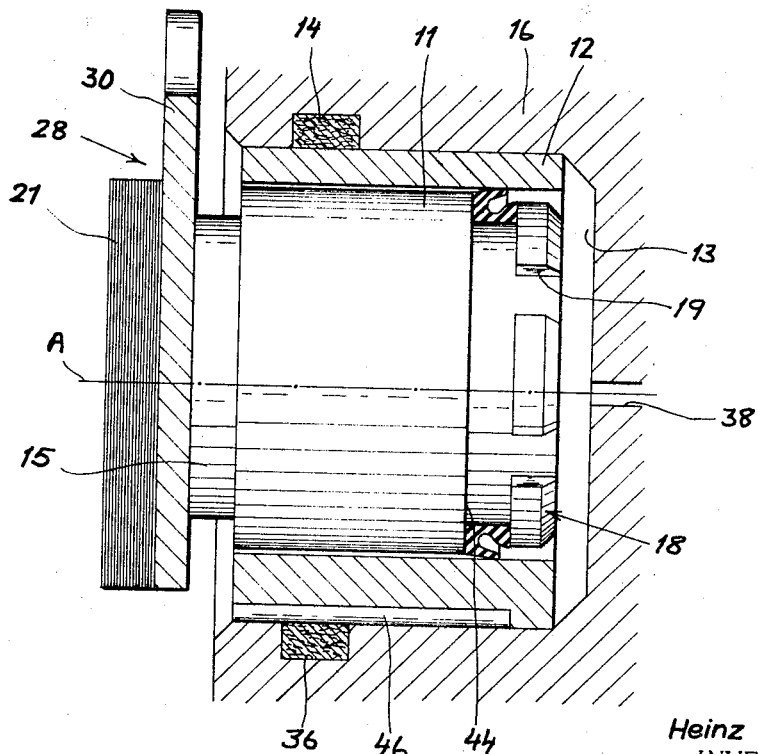
FIG. 2 is an axial cross-sectional view through the piston-and-cylinder arrangement of FIG. 1.

In FIG. 1, I show a yoke 10 (only the flange side of which is illustrated) whose flange 24 is adapted to receive bolts for affixing this yoke half to the axis housing of an automotive vehicle. The yoke has an open top portion 26 through which the brakeshoes 28 may be radially inserted and removed, each brakeshoe comprising a backing plate 30 and a backing lining 21. The latter has a surface center-of-gravity or centrum located at C with respect to its contact face for engagement with the brake yoke (FIG. 2). The yoke half 16 may be connected with the other and similar yoke half (not shown) by bolts passing through the bores 32 in the usual manner. The direction of rotation of the disk is represented by arrow 34.

Figure 3:
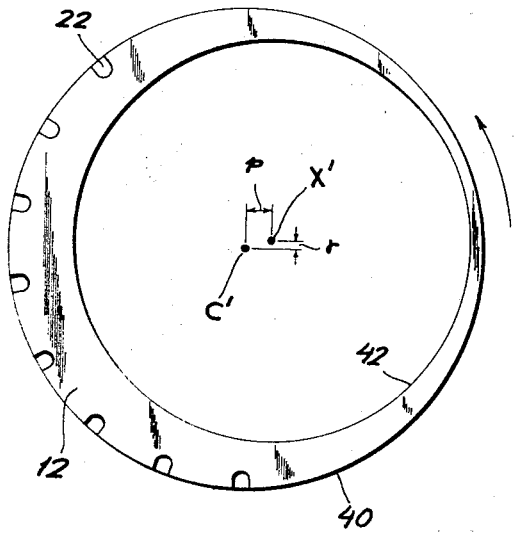
FIG. 3 is an elevational view of an adapter bushing according to this invention.

The yoke half is formed with a cylinder bore 13 which has an axis A aligned with the centrum C of the brake lining 21 as is conventional with disk-brake systems of earlier types. Moreover, the inner wall of the cylinder is formed with the usual groove 36 in which a sealing ring 14 is recessed. The sealing ring 14 serves to prevent escape of brake fluid, which is admitted to the cylinder via a bore 38, between the usual wheel-brake piston and the cylinder wall. However, in the system according to the present invention, the seal 14 cooperates with a bushing 12 of ceramic, stainless steel, polytetrafluoroethylene or other resin which is corrosion-resistant, wear-resistant and has a low coefficient of slide friction. The bushing 12 has a cylindrical outer periphery 40 corresponding to the cylinder bore 13 and of approximately the same diameter so that the sleeve can be received in this bore with a snug fit. By rotating the bushing about the axis C' of its outer surface 40, it is possible to adjust the center X' of its eccentric inner bore 42 to any position radially and peripherally offset from the centrum C. Thus the radial offset r and the peripheral offset p are represented diagrammatically in FIG. 3.

From FIGS. 1 and 2, it can be seen that the bore 42 of the sleeve or bushing 12 receives a piston 11 of a diameter less than the diameter of the wheel-brake piston it replaced, this piston having an axis at X, corresponding to the axis X' of the bore 42. Thus, the center of contact of the piston 11 with the backing plate 30 of the brakeshoe 28 is defined by the point X as shown in FIG. 1, the contact surface being formed by a boss 15 coaxial with the piston body. The piston 11 is formed with a circumferential groove 44 in which a flange-type seal 20 is received to sealingly engage the wall 42 of the sleeve 12, the piston having an abutment end 18 of lattice configuration with channels 19 permitting distribution of the fluid to the seal 20. The sleeve 12 is held in place within the cylinder 13 by a tension pin 46 permitting adjustment of the sleeve by rotating the same within a cylinder bore 13.

The assembly is formed with a conventional brake yoke by removing the usual piston, inserting the sleeve 12 and, after proper positioning of the latter, driving the pin 46 between the sleeve and the cylinder bore into one of the milled grooves 22 extending axially along the outer periphery of the sleeve. The piston 11 is then inserted and the brake operated in the usual manner.

Figure 5:
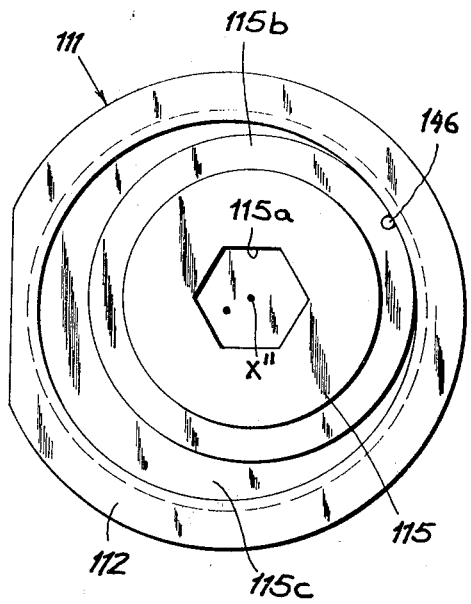
FIG. 5 is an elevational view of part thereof.
Figure 4:
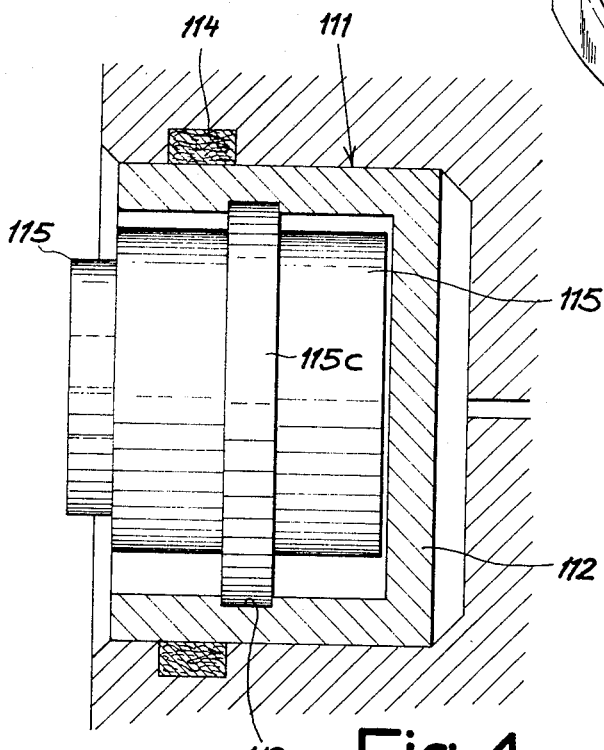
FIG. 4 is a view similar to FIG. 2 of another embodiment.

As illustrated in FIGS. 4 and 5, the bushing may constitute part of the piston. In this construction, the cylindrical contact surface or boss 115 of the piston 111 is engageable with the backing plate of the brakeshoe in the usual manner. A hexagonal recess 115a in this contact surface, however, permits rotation of the center portion 115b of the piston, which is mounted on an eccentric disk 115c in a circumferential groove 112a of a cup-shaped outer piston portion 112 to locate the center X'' of the contact surface of the piston at any eccentric location as may be desired.

A slit pin 146 may be inserted between the members 115b and 112 to lock the contact surface in the desired position. In this case, the seal 114 is engageable with the outer piston surface in the usual manner. The sleeve 112 is here cylindrical and forms part of the piston.

The invention described and illustrated is believed to admit of many modifications.

I claim:

1. In a hydraulically operable disk brake having a brake housing provided with a cylinder bore, a bushing mounted in said bore and having a cylindrical outer surface closely surrounded by the wall of said bore, a brakeshoe aligned with a bore and having a centrum of its braking surface lying along the axis of said bore, and a brake disk ahead of said brakeshoe and engageable therewith upon the delivery of brake fluid to said cylinder, the improvement which comprises a piston slidably received in said cylinder bore and axially shiftable therein to urge said brakeshoe against said disk, said piston having a contact surface against said brakeshoe and centered on its axis while said axis of said piston is offset from the axis of said bore, said contact surface being eccentrically mounted in said bushing.

2. The improvement defined in claim 1 wherein said bushing is a sleeve axially fixed in said cylinder bore and provided with an eccentric bore slidably receiving said piston.

3. The improvement defined in claim 2, further comprising an annular seal carried by said piston and slidably engaging an inner wall of said sleeve.

4. The improvement defined in claim 2, further comprising locking means between the outer wall of said sleeve and said cylinder bore retaining said sleeve in a selected angular position about the axis of the outer surface of said sleeve.

5. The improvement defined in claim 1, wherein said bushing forms part of said piston and is axially shiftable in said cylinder bore.

6. The improvement defined in claim 5, further comprising a rotatable body carrying said contact surface and mounted in said bushing, and means receivable between said body and said bushing for locking said body in a selected angular position about the axis of the outer surface of said bushing.

7. The improvement defined in claim 1 wherein said bushing is composed of wear- and corrosion-resistant material.

8. The improvement defined in claim 7 wherein said bushing is composed of a low-friction synthetic resin.

9. The improvement defined in claim 7 wherein said bushing is composed of a ceramic.

References Cited

UNITED STATES PATENTS

| | | | |
|---|---|---|---|
| 86,996 | 2/1869 | Miller | 92—165 |
| 1,788,950 | 1/1931 | Heiner | 92—59 X |
| 2,926,757 | 3/1960 | Armstrong. | |
| 2,937,722 | 5/1960 | Ruet. | |

GEORGE E. A. HALVOSA, Primary Examiner.

U.S. Cl. X.R.

188—1, 205